United States Patent
Taniguchi et al.

(10) Patent No.: US 6,656,871 B2
(45) Date of Patent: Dec. 2, 2003

(54) METHOD FOR PRODUCTION OF CATALYST

(75) Inventors: Shigeyoshi Taniguchi, Himeji (JP); Katsuji Tanihira, Himeji (JP); Makoto Horiuchi, Himeji (JP); Ryugo Kakimi, Tatsuno (JP)

(73) Assignees: ICT Co., Ltd., Osaka; International Catalyst Technology, Inc., Ridgefield Park, NJ (US); Nippon Shokubai Co., Ltd., Osaka (JP)

( * ) Notice: Subject to any disclaimer, the term of this patent is extended or adjusted under 35 U.S.C. 154(b) by 182 days.

(21) Appl. No.: 09/915,634

(22) Filed: Jul. 26, 2001

(65) Prior Publication Data

US 2002/0022572 A1 Feb. 21, 2002

(30) Foreign Application Priority Data

Aug. 14, 2000 (JP) ......................................... 2000-245751

(51) Int. Cl.[7] ........................... B01J 23/00; B05C 19/02; G05D 11/00; G08B 21/00; B05B 7/22
(52) U.S. Cl. ....................... 502/300; 118/423; 118/429; 137/87.02; 137/558; 340/619; 427/230; 427/238; 427/430; 427/443.2; 427/213; 427/245; 427/8
(58) Field of Search ........................ 502/300; 118/423, 118/429; 137/87.02, 558; 340/619; 427/230, 238, 430, 443.2, 243, 245, 8; 29/890; 414/289, 296

(56) References Cited

U.S. PATENT DOCUMENTS

| | | | |
|---|---|---|---|
| 4,038,939 A | * | 8/1977 | Hoyer et al. .................... 118/4 |
| 4,737,791 A | * | 4/1988 | Jean et al. .................... 342/124 |
| 5,165,970 A | * | 11/1992 | Schmidt et al. .......... 427/430.1 |
| 5,407,703 A | * | 4/1995 | de Jong et al. ............. 427/226 |
| 2002/0022571 A1 | * | 2/2002 | Taniguchi et al. .......... 502/300 |

FOREIGN PATENT DOCUMENTS

| | | | |
|---|---|---|---|
| DE | 297 07 189 U1 | 7/1997 | ............. C03B/5/24 |
| DE | 198 00 131 C1 | 5/1999 | ............. G01F/22/00 |
| JP | 06-122576 | 6/1994 | ............. C04B/41/85 |
| JP | 07-096198 | 11/1995 | ............. B01J/29/44 |
| WO | WO 97/19959 | 6/1997 | ............. G08F/4/603 |

OTHER PUBLICATIONS

Database Compendex Online Engineering Information, Inc., New York, NY, US: Zou Bin et al., "Cluster Structure in a Circulating Fluidized Bed"., Database Accession No. EIX94102010970 XP002186509. Abstract & powder Technol; Power Technology Feb. 1994 Publ by Elsevier Sequoia SA, Lausanne, Sitz, vol. 78, No. 2, Feb. 1994 (1994–02). pp. 173–178.

Database Compendex Onlin Engineering Information, Inc., New York, NY US; Pape Ron et al., "Numerical Stability Analysis for Reactive Multiphase Flow in Slurry Bubble Column Reactors and Solid Propellant Rockets", Database Accession No. EIX97213592987, XP002186510, Abstract & Proceedings of the 1996 ASME Fluids Engineering Division Summer Meeting Part 1 (of 2); San Diego, CA, USA Jul. 7–11 1996, vol. 236, No. 1, 1996, pp. 257–264, ASME Fluids Eng Div Publ FED; American Society of Mechanical Engineers, Fluids Engineering Division (Publication)FED 1996 ASME, New York, NY, USA.

\* cited by examiner

Primary Examiner—Mark L. Bell
Assistant Examiner—Patricia L. Hailey
(74) Attorney, Agent, or Firm—Fish & Richardson P.C.

(57) ABSTRACT

During the deposition of a catalytic component on a carrier, the position of the liquid level of a slurry containing the catalytic component is controlled with high accuracy and the adhesion of the slurry to the lateral face of the carrier is prevented. In the deposition of the liquid substance on the carrier by the introduction of the liquid substance into the carrier from the bottom face thereof, the liquid level near the top face of the carrier is detected by an image-processing sensor.

13 Claims, 4 Drawing Sheets

METHOD FOR PRODUCTION OF CATALYST

BACKGROUND OF THE INVENTION

1. Field of the Invention

This invention relates to a method for producing a catalyst. More specifically, it relates to a method for producing a catalyst which comprises controlling the liquid level of the top face of a monolithic carrier by an image-processing sensor, especially a method for producing an exhaust gas purifying catalyst.

2. Description of Related Art

In the deposition of a catalytically active component on a monolithic carrier, when the expensive active component is deposited also on the lateral face of the carrier, such lateral face so deposited does not treat exhaust gases and it rather brings the disadvantage of heightening the price of produced catalysts. Thus, it is required a method for not depositing or adhering the active component to the lateral face.

In this method, a slurry containing the active component is raised from the bottom face of carrier into the cells, and after the slurry has reached the top face of the carrier, the slurry in the cells is discharged from the lower side in a state not overflowing the top face. For preventing the slurry from overflowing the top face, it may cite a visual observation. It may use a laser or supersonic sensor in consideration of productivity.

The method using such a sensor, however, has the problem of not satisfactorily corresponding to variations in the viscosity and the speed of forced penetration of the slurry because it is incapable of confirming the position of the slurry with accuracy till the slurry reaches the top face, and capable of detecting the liquid level only after the slurry has surpassed the top face. Thus, in order to coat the slurry to the carrier completely, it has entailed the problem of suffering the slurry to overflow the top face and come to adhere to the lateral face and the device being used for the deposition.

SUMMARY OF THE INVENTION

We have pursued a diligent study of a method capable of accurately detecting the liquid level of the slurry at the proximity of the top face of the carrier while the slurry is ascending in the interior of the carrier, and have found that the position of liquid level of the slurry can be accurately detected by an image-processing sensor using a charge coupled device (CCD) camera. This invention has been perfected as a result.

The object of this invention is accomplished by a method for the production of a catalyst, characterized by adopting an image-processing sensor for detecting the liquid level at the top face of a monolithic carrier while a liquid substance containing a catalytic component to be deposited is being introduced into the carrier from the bottom face.

According to the present invention, it can eliminate the problems of the conventional method such as the adhesion of the liquid substance overflowing the top face of the carrier to the lateral face and the device being used for the deposition and the consequent loss of the expensive liquid substance and spotting of the carrier and device used. It also permits a saving in the cost of production by ensuring safety of coating and decreasing the loss of liquid substances.

The above and other objects, features and advantages of the present invention will become clear from the following description of the preferred embodiments.

BRIEF DESCRIPTION OF DRAWINGS

The accompanying drawing incorporated in and forming a part of the specification, illustrates several aspects of the present invention, and together with the description serve to explain the principles of the invention. In the drawings.

DETAILED DESCRIPTION OF THE PREFERRED EMBODIMENTS

Figure 1:
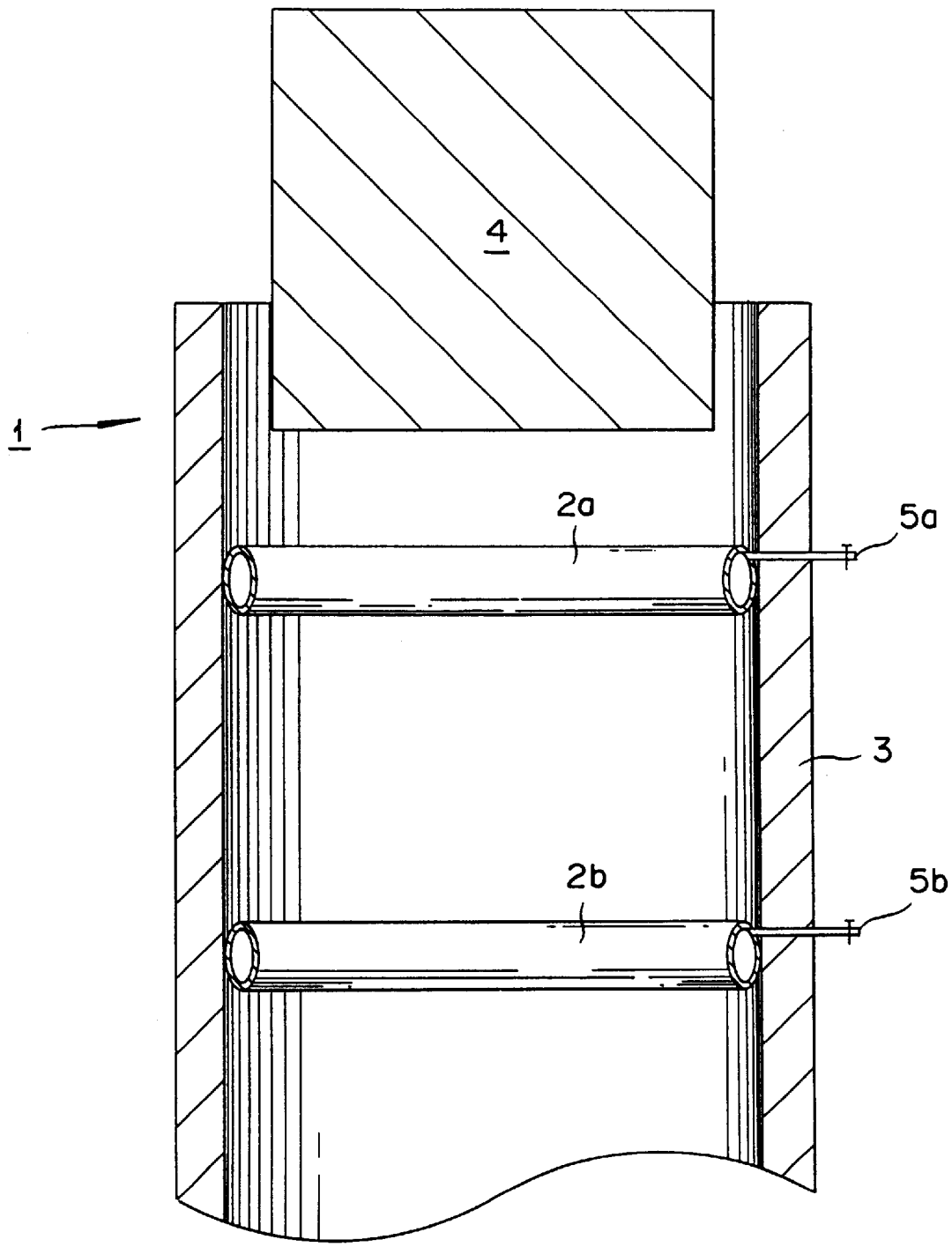
FIG. 1 is a partial cross section intended to describe the retain of a monolithic carrier in the case of deposition.

Now, this invention will be described in detail below.

The monolithic carrier to be used in this invention is not restricted but required to be a refractory structure having a plurality of cells penetrate through the interior thereof. Monolithic honeycomb carriers and metal honeycomb carriers may be cited as examples.

The monolithic carriers which are usable herein generally include honeycomb carriers using cordierite, mullite, α-alumina, zirconia, titania, titanium phosphate, aluminum titanate, alumino silicate, and magnesium silicate as raw materials and integral structures using such heat-resistant metals as stainless steel and Fe—Cr—Al alloys, for example.

The monolithic carrier is produced by a method of extrusion molding, or reeling a sheet like element into a roll, or the like. The shape of the gas passages in the monolithic carrier (the shape of cells) may be hexagon, tetragon, triangle, or corrugation whichever best suits the occasion. The cell density {the number of cells per unit cross section, 6.45 $cm^2$ (1 square inch)} is generally in the range of 100 to 1500 cells, though variable with the kinds of exhaust gas such as unburnt hydrocarbon, carbonmonoxide, and nitrogen oxides which occur in tunnels or emanate from plants and internal combustion engines such as automobile engines and diesel engines. Incidentally, the visible shape of the carrier is not discriminated but may be a triangle, circular, elliptic, or rectangular cross section.

The monolithic carrier is put to use as coated in advance with a refractory inorganic oxide or as simultaneously coated with such an inorganic oxide and a catalytic component effective in treating an exhaust gas. This invention designates such inorganic oxide, catalytically active component, and mixture thereof as a "catalytic component." Examples of the refractory inorganic oxide may include γ, δ, η, and θ activated alumina, cerium oxide, zirconium oxide, tungsten oxide, titanium oxide, silicon oxide, zeolite, alkaline earth elements, and complex oxides thereof. The catalytic component is not particularly discriminated but required to be capable of disposing of harmful substances in the exhaust gas. Examples of the catalytic component may include noble metals such as rhodium, platinum, and palladium, base metals such as manganese, cobalt, chromium, nickel, and iron, and mixtures thereof.

The catalytic component is treated by a known method such as a mill into slurry and then deposited on a monolithic carrier. The slurry, which is usable in this invention, is not restricted but required to be capable of ascending the interiors of the cells. The slurry can be produced for example by treating an inorganic oxide such as an alumina powder with an aqueous inorganic or organic acid solution or by treating an inorganic oxide such as alumina and a catalytic component such as the salt of platinum with an aqueous inorganic or organic acid solution. The liquid substance, which is used in this invention, embraces the aqueous solution of a catalytic component besides the slurry mentioned above.

Further, this invention embraces also multilayer coating. The term "multilayer coating" as used herein means depositing coats of one same kind or different kinds in a multiple steps. In highly refractory and high performance catalysts, catalysts having a plurality of coats such as two are usual.

Now, this invention will be described below with the drawings attached hereto.

FIG. 1 is a partial cross section intended to describe the retention of a carrier. The method will be described with a cylindrical carrier as a typical example. In FIG. 1, a hollow frame 3 of a shape permitting insertion therein of a carrier 4 is prepared in advance and provided on the inner face thereof with at least one retainer 2 (two in FIG. 1) shaped like a swimming ring that is able to press the carrier 4 from the lateral side thereof.

For the purpose of impregnating the carrier 4 with slurry (not shown), the retainer 2 like a swimming ring retains the carrier 4 and seals the lateral side of the carrier as well. The retainer 2 is made of an elastic material such as rubber or plastic or soft plastic because it is inflated by inserting a gas such as air and consequently enabled to retain the carrier 4. The gas is admitted into this retainer via a nozzle 5 that is disposed on the outer face of the retainer 2. Optionally, the retainer may be used at one point in the bottom face.

Though the internal shape of the hollow frame 3 is not restricted but required to permit insertion therein of the carrier, it is preferred to bear similarity with the outer shape of the carrier. Specifically, when the carrier has a circular outer shape, the inner face of the frame is also a circular shape. The reason for constructing the flame as described above is that when the retainer 2 is inflated, it will uniformly hold the whole of the lateral face of the carrier 4 and seal the lateral face thereof as well.

The carrier 4 is inserted into the interior of an impregnating device 1 from the above portion thereof. When the carrier 4 reaches a position with the bottom face of the retainer 2b, this motion is stopped. Then, the carrier 4 is fixed by inflating the retainer 2b. The retainer 2b so inflated is retained in the inflated state. Thereafter, with respect to the top face of the carrier, the retainer 2a is also inflated and fixed in the inflated state. Consequently, the carrier is fixed in the impregnating device.

Figure 2:
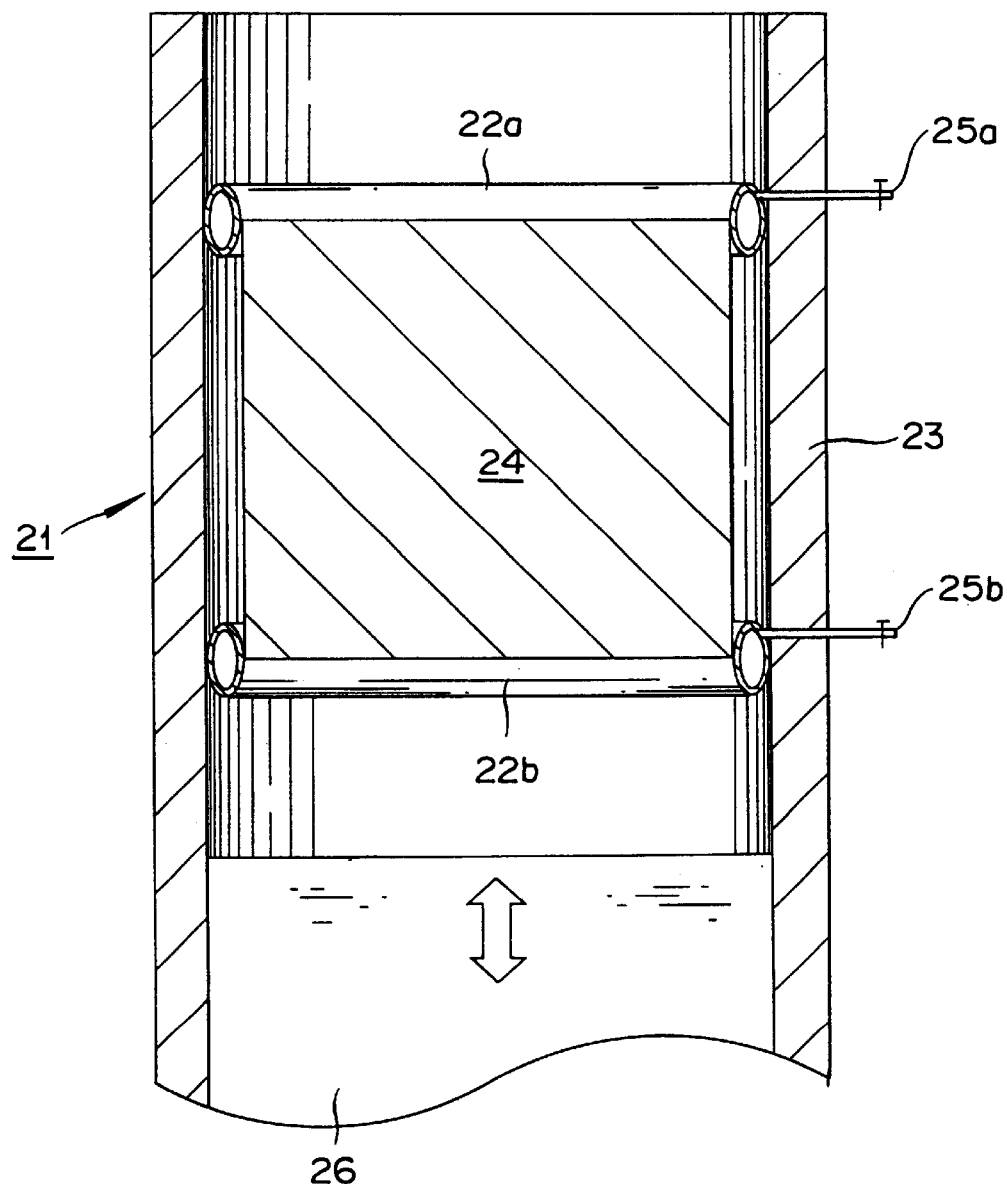
FIG. 2 is a partial cross section of the impregnating device for depositing a slurry on a carrier.

Now, the method for depositing the carrier with a slurry as a typical example will be described below. FIG. 2 is a partial cross section illustrating one example of the impregnating device 21 serving to deposit a slurry on a carrier. In FIG. 2, a slurry 26 held inside a hollow frame 23 is ascended in the interior of the frame 23 by the action of a known liquid delivering device of the shape of a piston (not shown). The ascent of the slurry 26 in the interior of a monolithic carrier 24 is monitored and detected from above the carrier with an image-processing sensor 27. The image sensor 27 is positioned above the monolithic carrier. Commendably, the distance of this sensor 27 from the carrier is suitably decided in consideration of factors such as the precision of the image sensor 27 and the color of the slurry.

The image sensor 27 is set as follows. The monolithic carrier 24 is set in an impregnating device 21. The color of the carrier 24 is extracted by the image sensor (CCD camera) 27. The "image (processing) sensor" 27 means a sensor that extracts the color by setting a relevant range based on a color image signal from the camera and then judging the coincidence of a designated color on an image plane. The designated color (such as of the carrier), for example, has the number of picture elements of the designated color decreased when a different color (such as of the slurry) is appeared therein. The ascent of liquid level can be detected by the change of the number of picture elements. The white of carrier is extracted as the designated color, for example. In the multilayer coated catalyst, the color of the catalyst deposited in the immediately preceding step is to be extracted. In that case, a certain number of picture elements are measured in the range of 100,000 to 300,000, for example, though depending on the quality of CCD camera in use. Since any sort of slurry differs in color from the carrier, when the slurry is reached toward the proximity of the top face of the carrier, a color different from the extracted color develops on the image plane of the camera. When such a different color appears on the image plane, the number of picture elements of the extracted color in advance comes to be decreased. This decline permits detection of the ascent of the slurry to the proximity of the top face of the carrier. The expression "the proximity of the top face of the carrier" as used herein refers to the range embracing the top face of the carrier and the interior of the carrier and allowing detection by the image sensor.

The range detectable by the image sensor is variable with the cell density and cross section of carrier, the quality and lens of CCD camera, and the precision of image sensor. Though the stopping position of the slurry at the top face is not easily set in advance because it is affected by the viscosity of slurry and the speed of ascent of slurry, it is possible by the image sensor to detect the slurry at the proximity of the top face and brings the slurry to stop at the top face without suffering the slurry from overflowing the top face.

Further, since the image sensor 27 is capable of detecting the slurry not only at the proximity of the top face of the carrier 24 but also in the interiors of the cells, it is possible to detect the liquid level of the slurry 26 in the interiors of the cells. It is, consequently, possible either to coat the carrier 24 completely as far as the top face with the slurry 26 or leave quantitatively the undeposited part to a certain degree in the vicinity of the top face.

The position at which the CCD camera is set may be directly above or oblique relative to the top face of the carrier 24 so long as the detection can be attained.

The site of the production of the carrier may be furnished with an illuminating device. The kind, quantity, and position of installation thereof are not restricted so long as they do not affect the detection by the image sensor.

Since the use of the image sensor 27 permits the position of the slurry 26 to be accurately detected, the slurry can be stopped without overflowing the top face of the carrier 24. After coating has been completed up to the top face, aspirating the excess slurry from the bottom face of the carrier or expelling the excess slurry by blowing a gas from above the carrier terminates it.

The series of steps mentioned above may be performed either individually or continuously automatically, The carrier is removed from the impregnating device after the gas filled in the retainers 22a and 22b has been withdrawn from the nozzles 25a and 25b, respectively. Then, the removed carrier is dried and optionally calcined to complete a catalyst.

Figure 3:
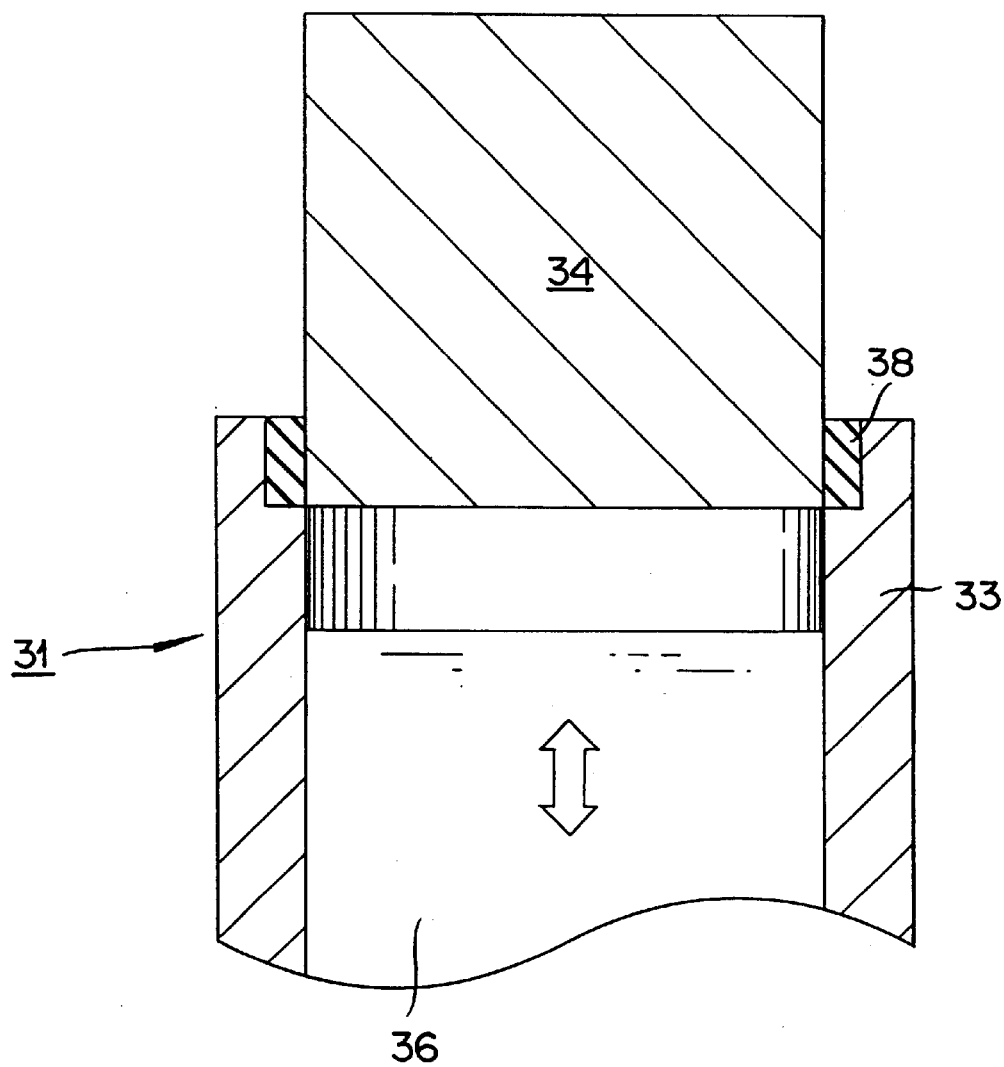
FIG. 3 is another partial cross section of the impregnating device.

FIG. 3 is another partial cross section of the impregnating device 31 for depositing the slurry on the carrier. In FIG. 3, a slurry 36 is ascended in the interior of a hollow frame 33 made of a hard resin 33 by a known liquid-delivering device of the type of piston (not shown). When the slurry 36 so ascending happens to leak between the carrier 34 and the frame 33, the leaking slurry 36 is at a disadvantage in adhering to the carrier 34 and the frame 33 and inducing a loss of the expensive slurry. To avoid this leakage, a retainer 38 made of an elastic substance such as rubber or plastic or soft plastic is used to seal tightly the gap between the carrier 34 and the frame 33 and prevent the slurry 36 from leaking to the exterior.

The slurry is deposited on the carrier by controlling the liquid level using the image sensor 37. The carrier coated with the slurry is dried and optionally calcined to complete a catalyst.

Figure 4:
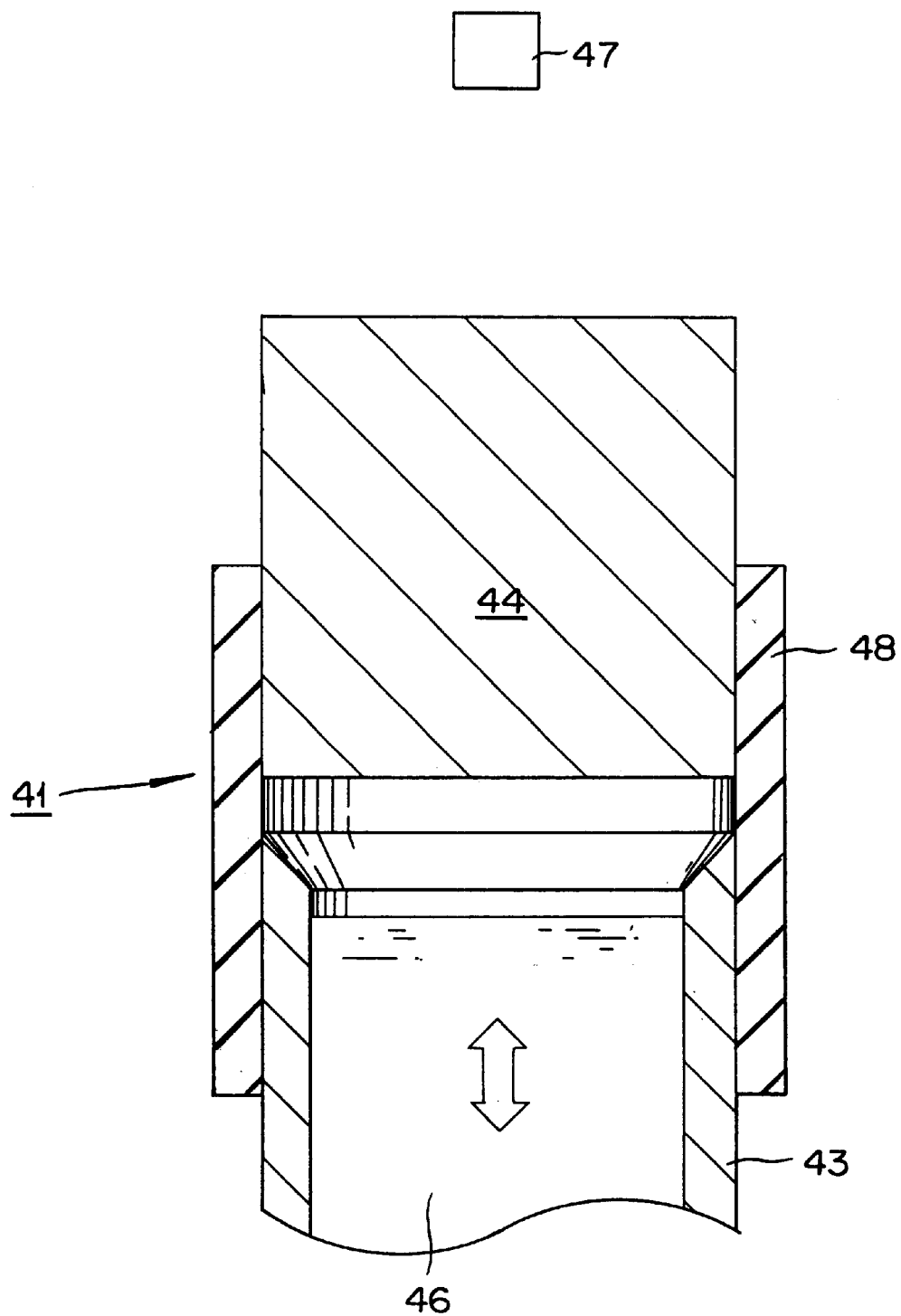
FIG. 4 is a partial cross section of yet another example of the impregnating device.

FIG. 4 is a partial cross section of yet another example of the impregnating device 41 for depositing the slurry on the carrier. In FIG. 4, since a carrier retainer 48 made of an elastic substance such as rubber or plastic or soft plastic retains a carrier 44, the carrier 44 can be retained in intimate contact with the retainer 48. If the slurry 46 has ascended to the site of this intimate contact, this slurry 46 will not leak from the gap between the carrier 44 and the retainer 48. Thus the slurry 46 that contains an expensive material can be used or reused without incurring any loss.

The carrier retainer 48 is fixed to a frame 43 made of a material such as stainless steel, which is incapable of inducing an interaction with the slurry. Since the top of the frame 43 falls below the retainer 48, it is enabled to retain the carrier 44. The top shape of the frame 43 is not restricted but required to be capable of retaining the carrier and causing the slurry to flow inwardly. It may be inclined inwardly, for example.

The slurry 46 is ascended in the interior of the retainer 48 by a known liquid-delivering device such as a piston (not shown).

The slurry is deposited on the carrier by controlling the liquid level using the image sensor 47. The carrier coated with the slurry is dried and optionally calcined to complete a catalyst.

The devices for retaining and impregnating the carrier may be selected from among known devices except for the image sensor.

Methods for depositing the slurry on the carrier automatically by controlling the liquid level with the image sensor are embraced in the scope of this invention.

EXAMPLES

Now, this invention will be specifically described below with the examples. It should be noted that this invention is not limited to these examples.

Example 1

A monolithic carrier (400 cpsi/6 mil, available from Denso K.K. in Japan) was set in an impregnating device illustrated in FIG. 2. A CCD camera set above the carrier was used to extract the white part of the carrier. The number of picture elements was 100,000 to 120,000.

Then, a slurry containing a Pd type catalytic component was forcibly introduced into the carrier from the bottom face thereof. This slurry had a specific gravity of 1.600 g/ml and a viscosity of 500 cps. The flow velocity of the slurry being introduced was 3,000 L/hr. The system was set so as to stop the introduction of the slurry when the blown slurry ascended at the proximity of the top face of the carrier, the number of picture elements of the extracted white decreased, and the number surpassed 1,000. This is termed as a tolerance 1,000 in the number of picture elements. The system could be stopped without suffering the slurry to overflow the top face of the carrier and adhere to the lateral face thereof.

At this time, the slurry is completely coated to the top face without overflow on the lateral face.

Example 2

The procedure of Example 1 was repeated except that the flow velocity of the slurry was changed to 2,800 L/hr. At this time, the top face of the carrier was coated with the slurry except for the two cells next to the outermost periphery.

Example 3

The procedure of Example 1 was repeated except that the flow velocity of the slurry was changed to 1,000 L/hr. A size of about 5 mm from the top face of the carrier was left uncoated with the slurry.

Example 4

The procedure of Example 1 was repeated except that the viscosity of the slurry was changed to 1,000 cps. A size of about 5 mm from the top face of the carrier was left uncoated with the slurry.

Example 5

The procedure of Example 1 was repeated except that the tolerance was changed to 60,000. A size of about 5 mm from the top face of the carrier was left uncoated with the slurry.

Example 6

The catalyst prepared in Example 1 was set in the device illustrated in FIG. 2. The brown portion of the prepared catalyst was extracted by the CCD camera set above the catalyst. The number of picture elements was 150,000 to 170,000.

Then, a slurry containing a Rh type catalytic component was introduced into the carrier with force from the bottom face of the carrier. This slurry had a specific gravity of 1.300 g/ml and a viscosity of 150 cps. The flow velocity of the slurry during the introduction was 2,500 L/hr.

The system was so set as to stop the introduction of the slurry when the yellowish white slurry ascended at the proximity of the top face of the catalyst, the number of picture elements of the extracted brown was declined, and the number fell below 10,000.

As a result, the system could be stopped without suffering the slurry to overflow the top face of the catalyst and adhere to the lateral face. At this time, the top face of the catalyst was coated with the slurry except for three cells next to the outermost periphery.

COMPARATIVE EXAMPLE

A monolithic carrier (supra) was set in an impregnating device.

Then, a slurry containing a Pd type catalytic component was introduced into the carrier with force from the bottom face thereof. This slurry had a specific gravity of 1.600 g/ml and a viscosity of 500 cps. The flow velocity of the slurry during the introduction was 3,000 L/hr.

The liquid level of the slurry was detected with a laser sensor. Since the laser sensor only could detect the liquid level after the slurry had surpassed the top face of the carrier, the slurry overflowed and adhered to the lateral face of the carrier.

As demonstrated above, this invention is to control the position for stopping the liquid level, the uncoated portion of the carrier, and the overflow by optimizing conditions such as the tolerance of CCD camera in the number of picture elements, the viscosity of slurry, and the flow velocity of slurry by force, while the conventional laser sensor was incapable of controlling the position for stopping the liquid level of the slurry.

It is possible to effect the deposition with high accuracy without inducing excess adhesion to the lateral face of the carrier by combining the image sensor and the retainer.

The entire disclosure of Japanese Patent Application No. 2000-245751 filed on Aug. 14, 2000 including specification, claims, drawings and summary are incorporated herein by reference in its entirety.

What is claimed is:

1. A method for producing a catalyst, comprising:
   introducing a liquid substance containing a catalytic component into a monolithic carrier as a flow from the bottom face thereof,
   detecting the liquid level near or at the top face of the carrier by an image-processing sensor placed above the carrier,
   halting the flow near or at the top face of the carrier to avoid overflow of the liquid substance, and
   removing the liquid substance from the bottom face of the carrier.

2. A method according to claim 1, wherein a cross section of the carrier has a shape selected from the group consisting of triangle, circle, ellipsis, and tetragon.

3. A method according to claim 2 further comprising an impregnating device including a hollow cylinder having an inner surface identical or similar in shape with or to the shape of the cross section and a larger inside diameter than the shape of the cross section.

4. A method according to claim 3, wherein the cylinder has at least one retainer of the shape of a swimming ring disposed on the inner face of the cylinder substantially horizontally across the entire circumference.

5. A method according to claim 4, wherein a number of the retainer is two or three.

6. A method according to claim 4, wherein the retainer holds the carrier by inflation by inserting a gas therein.

7. A method according to claim 4 further comprising a carrier-delivering device for delivering the carrier above the impregnating device and setting it in the device.

8. A method according to claim 4 further comprising a device for feeding the liquid substance disposed below the impregnating device.

9. A method according to claim 3, wherein a portion of the inner face of the cylinder contacting the carrier is an elastic substance.

10. A method according to claim 9, wherein the elastic substance comprises rubber or plastic.

11. A method according to claim 3, wherein the inner face of the cylinder is made of an elastic substance and further comprising another hollow cylinder disposed in contact with the inner side of the cylinder.

12. A method according to claim 11, wherein the elastic substance comprises rubber or plastic.

13. A method according to claim 1, wherein the image sensor comprises a CCD.

* * * * *